Feb. 9, 1965  J. B. MELLETT  3,168,899
MULTI-FUEL HEATER CONTROL VALVE
Filed May 3, 1961  2 Sheets-Sheet 1
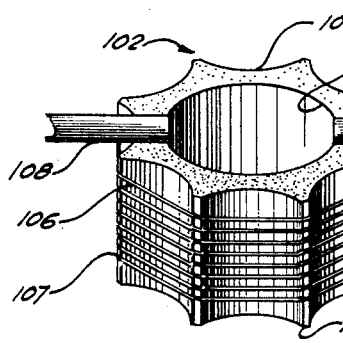
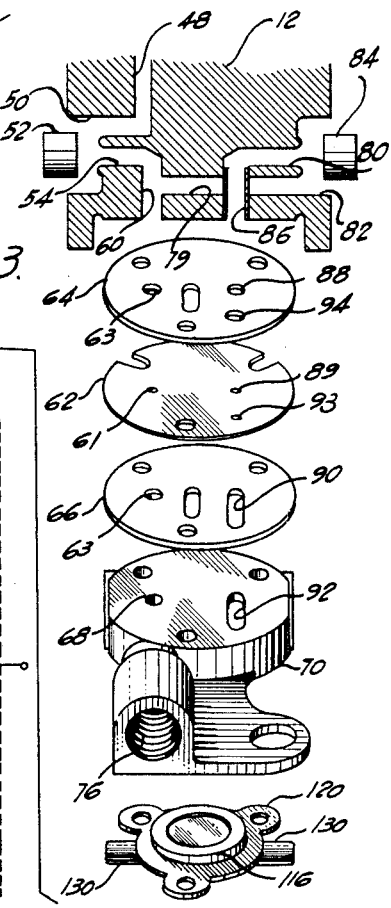
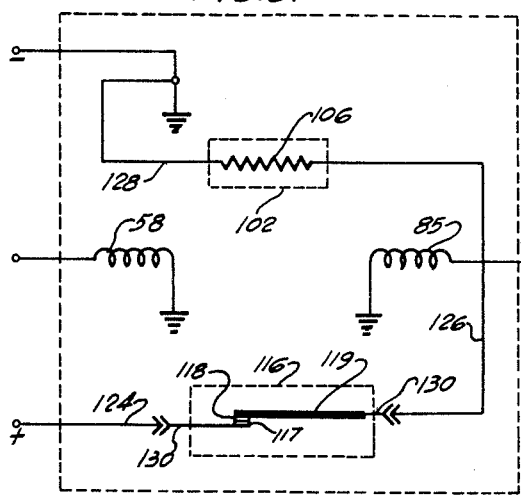
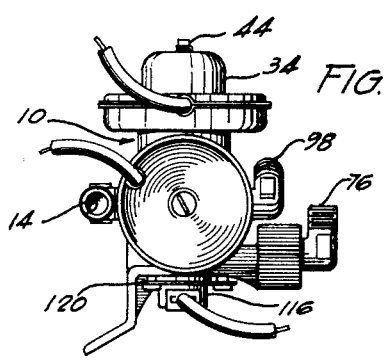
INVENTOR
Jesse B. Mellett
By A. G. Douras
Attorney

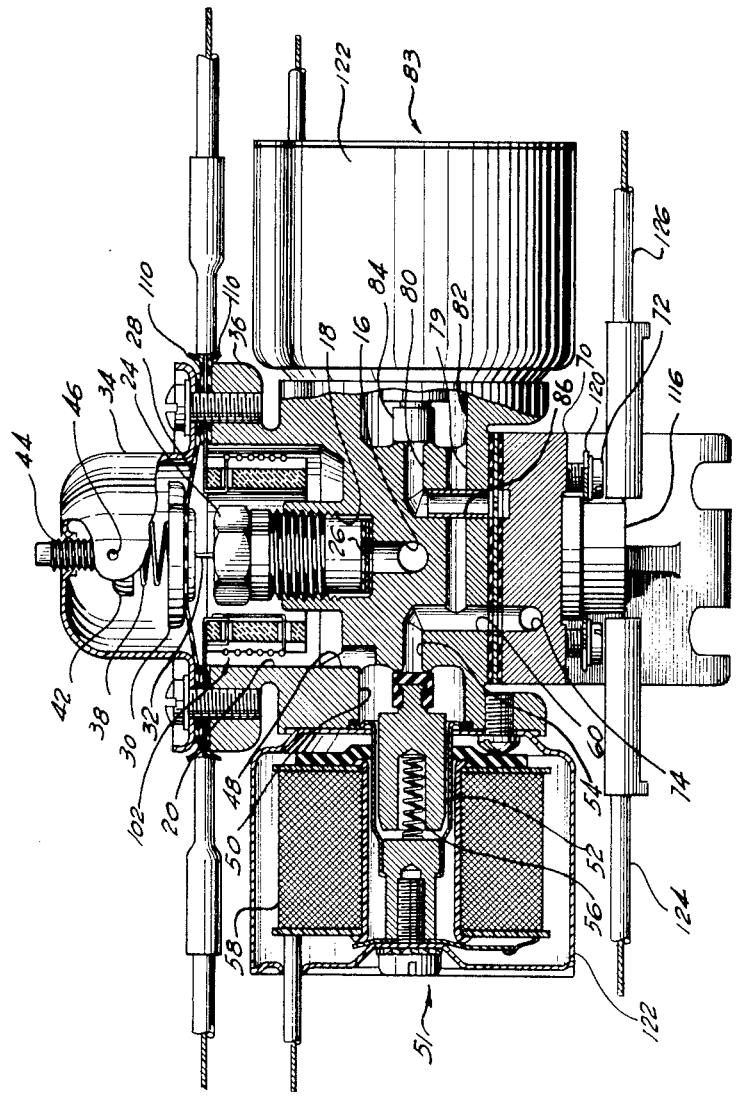

United States Patent Office 3,168,899
Patented Feb. 9, 1965

3,168,899
MULTI-FUEL HEATER CONTROL VALVE
Jesse B. Mellett, Zionsville, Ind., assignor to Stewart-Warner Corporation, Chicago, Ill., a corporation of Virginia
Filed May 3, 1961, Ser. No. 107,537
2 Claims. (Cl. 137—341)

This invention relates to a control valve operable to meter fuel to a heater for regulating the heat output thereof, and more particularly, to a control valve operable to meter substantially any liquid fuel regardless of its flow characteristic at its supply temperature.

A typical control system for a fuel valve of this type is disclosed in Patent No. 2,481,630, issued September 13, 1949, to V. N. Tramontini, entitled Heater Control. A typical control valve, of which this disclosure forms an improvement, is shown in the Patent No. 2,602,468, issued July 8, 1952, to G. W. Allen, et al. entitled Flow Restrictor.

The heat output of many existing gasoline heaters is regulated by metering the quantity of fuel admitted to the heater. A control valve meters the gasoline through calibrated flow restrictors in the flow path as a function of the pressure differential across the restrictors. The inlet or supply temperature of the gasoline to the valve is of no great importance since gasoline experiences only a small change in its viscosity at ambient winter temperatures of less than 50° F.

Heavier petroleum fuels commercially available have viscosities that change by a relatively large percentage throughout such temperature ranges. Since accurate operation of control valves of this type depends upon uniform flow characteristics of the metered fuel, unless the viscosity of the metered fuel is maintained constant independently of the fuel supply temperature, the valve cannot accurately control the heater output.

This invention provides means wherein the fuel metered by the control valve is kept at a substantially uniform temperature regardless of the fuel supply temperature. Thus, flow characteristics of the fuel remain uniform so that the control valve meters accurately throughout all, and independently of the possible fuel supply temperatures.

An object of this invention is to provide a heater control valve capable of accurately metering substantially any liquid fuel, including fuels having the characteristic of rapidly changing viscosity for a generally small change in temperature, independently of the supply temperature of the fuel.

Another object of this invention is to provide a heater control valve having means therein operable to sense the temperature of the fuel metered thereby.

Another object of this invention is to provide a heater control valve having a thermostat operable to sense the temperature of the metered fuel and having a heating source operably responsive to a signal from the thermostat to heat the fuel in the valve to within the desired metering temperature.

In order that the principles of the invention can be readily understood, reference is hereby made to a particular embodiment described in the specification and shown in the accompanying drawings forming a part thereof, wherein:

FIG. 1 is an end elevational view of the control valve forming the subject matter of this invention;

FIG. 2 is a side elevational view, partially in longitudinal section, of the valve as shown in FIG. 1;

FIG. 3 is an exploded perspective view, partially in section, of the restrictors forming the fuel flow paths within the valve of FIG. 1;

FIG. 4 is a perspective view of a heating element used in the valve of FIG. 1; and FIG. 5 is a partial electrical wiring schematic of the valve of FIG. 1.

The control valve includes a valve body having inlet and outlet openings interconnected by a plurality of through passageways. Restrictors in the passageways operate to meter predetermined quantities of fuel as a function of the pressure differential across the restrictors and the flow characteristics of the fuel. Solenoid operated valves control the flow paths through the restrictors for regulating the fuel flow to the valve outlet.

Referring to the particular structure of the subject valve, valve body 10 has an inlet 14 that communicates through passageway 16 (FIG. 2) to small cylindrical threaded opening 18. The opening 18 communicates with and is adjacent larger cylindrical chamber 20. A pressure regulator 24 of the well known needle control type is threaded into the opening 18 against an interposed gasket 26 therein. The chamber 20 is closed by a resilient diaphragm 28 having at its center a rigid bearing member 30 engaging needle control 32 of pressure regulator 24. The position of needle control 32 within the pressure regulator 24 controls the pressure drop of the fuel across the pressure regulator 24. Cap 34 secures diaphragm 28 to flange 36 of the valve body 10.

A spring 38 is interposed between bearing member 30 on diaphragm 28 and spring mount 42 adjustably supported on screw 44 threaded into the end of cap 34. Adjustment of the screw 44 balances the compressive force of the spring 38 against diaphragm 28 and the needle control 32 to regulate the pressure drop across pressure atmosphere so that the movement of the diaphragm 28 is not resisted by changes of pressure within the cap 34.

Passageway 48 within valve body 10 communicates chamber 20 with chamber 50. An on-off solenoid actuated valve 51 has movable valve member 52 operable to cover passageway 54 extending from chamber 50. The valve member 52 is biased by spring 56 to cover the passageway 54 and attracted by energized solenoid coil 58 of the on-off valve 51 to open the passageway 54. Passageway 54 (see FIG. 3) communicates via passageway 60, through calibration orifice 61 in orifice plate 62 and the aligned openings 63 in gaskets 64 and 66 disposed on opposite sides of the plate 62, to passageway 68 in valve head 70. Bolts 72 (FIG. 2) threaded into valve body 10 secure valve head 70, the orifice plate 62 and gaskets 64 and 66 against the valve body. Passageway 74 (FIG. 2) in valve head 70 communicates the passageway 68 with fuel outlet 76 (FIGS. 1 and 3) of the valve. The outlet 76 communicates with a heater (not shown) to deliver fuel thereto for the low heat output requirement thereof.

Another passageway 79 (FIG. 3) communicates passageway 60 with a chamber 82 disposed adjacent solenoid actuated restriction valve 83. The restriction valve 83, structurally the same as the on-off valve 51, has a movable valve member 84 spring biased to close passageway 80 extending from chamber 82 and solenoid actuated by coil 85 (FIG. 5) of valve 83 to open passageway 80. Passageway 80 communicates via passageway 86, through aligned opening 88 and orifice 89 in the gasket 64 and the orifice plate 62 respectively, through slot 90 in gasket 66 to elongated recess 92 in the valve head 70. The flow path is then directed through orifice 93 and opening 94 in the orifice plate 62 and gasket 64 respectively, to a passageway (not shown) in valve body 10 that communicates with high heat fuel outlet 98 (FIG. 1). The aligned openings in the orifice plate 62, gaskets 64 and 66, and valve head 70 are such that a series flow results, v.i. from passageway 86 through opening 88, orifice 89, slot 90 and recess 92, orifice 93, opening 94, via the unshown passageway to the high heat fuel outlet 98. The fuel from outlet 98 is communicated to the heater (not shown) for supplying an additional quantity of fuel thereto for the high heat output requirements thereof.

When the on-off valve 51 is open and the restriction valve 83 is closed, a continuous flow path communicates fuel from the valve inlet 14 to the valve outlet 76 which comprises the metered fuel for the low heat output requirement of the heater. When the restriction valve 83 is also open, fuel from the valve inlet 14 is communicated to both the valve outlets 76 and 98. Thus the variable requirements of heat output can be satisfied by opening or closing the restriction valve 83 to vary the quantity of fuel admitted to the heater.

For accurate control of the heater output, the quantity of fuel admitted to the heater must be accurately metered by the restriction orifices 61, 89 and 93 of orifice plate 62. Certain fuels such as the heavier grades of fuel oil have a relatively large increase in their viscosity for a small change of temperature, particularly at expected ambient winter temperatures below 50° F. Consequently, unless provisions are made to maintain the viscosity of the metered fuel substantially constant regardless of the supply fuel temperature, the heater output cannot be accurately controlled. This invention provides means associated with the control valve to maintain the temperature of the metered fuel relatively constant independently of the fuel supply temperature. Thus the metered fuel has a relatively uniform viscosity which permits accurate metering thereof for accurate heat output control of the heater.

A heating source 102 (FIGS. 2 and 4) is disposed in close proximity of the fuel in the control valve, as in chamber 20 (FIG. 2). The heating source 102 includes a frame 104 having an opening 103 which fits over pressure regulator 24. The frame 104 is made of porcelain or other like material which is nonconductive and is unaffected chemically by the fuel. A heating element 106 is wound around frame 104 and kept separate from the adjacent strand by means of spaced grooves 107 in projecting tabs 109. Terminal leads 108 connect the ends of heating element 106 on the opposite sides of frame 104. The leads 108 are generally flexible to allow movement of the frame 104 within chamber 20 away from the diaphragm 28 for unrestricted movement of the diaphragm. Rubber gaskets 110 are disposed on opposite sides of the terminal leads 108 to prevent shorting thereof with the valve body 10 or cap 34.

Thus an electric current flowing through heating coil 106 heats the fuel within the control valve to a temperature independent of and higher than the fuel supply temperature. The fuel in turn heats the pressure regulator 24 to insure a uniform pressure drop across the pressure regulator because of the uniform fuel viscosity.

Since the ambient temperature of the fuel source and consequently the inlet fuel temperature will vary, provisions must be made to deenergize the heating source 102 to avoid needless excessive heating of the fuel. A thermostat 116 having contacts 117 and 118 (FIG. 5) and a bimetal arm 119 is connected in series with the heating coil 106. The thermostat 116 is held against the valve head 70 by bracket 120 and the bolts 72. The valve head 70 will be representative of the temperature of the metered fuel since the low heat fuel outlet 76 extends therefrom and since the high heat fuel flow path is through recess 92 therein. The bimetal arm 119 can be adjusted so that contacts 117 and 118 open and close at the desired temperature range for which the control orifices 61, 89 and 93 of orifice plate 62 are calibrated.

Generally, energization of the heat source 102 will only be necessary upon starting the heater and/or when the temperature of the fuel source is relatively low. Because of the efficient heating of immersed heat element 102, the temperature of the fuel will readily be brought up to the desired metering temperature. Thus, as the thermostat 116 senses that the temperature of the fuel is within the accurate metering range, bimetal arm 119 opens contacts 117 and 118 to deenergize the heat source 102. The heat emitted by electric coils 58 and 85 of the on-off valve 51 and restriction valve 83 is trapped in part in casings 122 (FIG. 2) to maintain the fuel at the acceptable metering temperature.

FIG. 5 shows a wiring schematic of the energized circuits in the control valve. Coil 58 of the on-off valve 51 and coil 85 of restriction valve 83 are controlled by a heater control such as shown in the above-mentioned Patent No. 2,481,630 to Tramontini. Thermostat contacts 117 and 118 energize and deenergize a circuit including an electrical potential, conductors 124, 126 and 128, and the heating coil 106. Terminals 130 on the thermostat 116 allow a ready slip connection with the conductor 124 and 126.

While one embodiment has been shown, it will be apparent to those skilled in the art that many modifications can be made in the structure and configuration of the control valve without departing from the spirit of the invention. Accordingly, it is desired that the invention not be limited to the embodiment shown but by the limitation recited in the appended claims.

What is claimed is:

1. In a heater control valve having a valve body through which a restricted flow passageway extends from an inlet port to an outlet port for transmitting high viscosity fuel from a fuel source at a rate dependent on the pressure drop across said restricted passageway and the fuel viscosity and wherein said inlet port is adapted to be controlled by a pressure regulator valve disposed in a chamber through which said fuel is adapted to pass and said outlet port is adapted to be controlled for permitting the passage of said fuel therethrough, the improvement comprising an electrically insulating body in said chamber, and a plurality of spaced apart electrically conductive serially connected bare strands of a heating element carried by said body and adapted to be submerged in the fuel in said chamber for direct contact with the fuel in said chamber, whereby said fuel is adapted to be directly heated by said element on energization of said heating element for lowering the viscosity of said fuel in order to maintain a desired pressure drop across said passageway.

2. In a heater control valve having a valve body through which a plurality of restricted flow passageways extend from a common inlet port to a plurality of different outlet ports for transmitting high viscosity fuel from a fuel source at a rate dependent on the pressure drop across said restricted passageways and the fuel viscosity and wherein the terminal portions of said passageways are located adjacent a common valve head structure and wherein said inlet port is adapted to be controlled by a pressure regulator valve disposed in a chamber through which said fuel is adapted to pass and said outlet ports are adapted to be selectively controlled for permitting the passage of said fuel therethrough, the improvement comprising an electrically insulating body in said chamber, a plurality of spaced apart electrically conductive serially connected bare strands of a heating element carried by said body and adapted to be submerged in the fuel in said chamber for direct contact with the fuel in said chamber, and a thermostatic switch adjacent a said common valve head structure for sensing the temperature of said fuel in the terminal portions of said passageways to control the electrical energization of said heating element in accordance with the temperature of said fuel whereby the viscosity of the fuel entering said passageways is maintained within predetermined limits.

References Cited in the file of this patent

UNITED STATES PATENTS

| | | |
|---|---|---|
| 1,534,091 | Smoot | Apr. 21, 1925 |
| 1,654,614 | Smith | Jan. 3, 1928 |
| 1,861,877 | Quill | June 7, 1932 |
| 1,988,289 | Wittemann | Jan. 15, 1935 |
| 2,556,557 | Schweitzer | June 12, 1951 |
| 2,579,215 | Te Nuyl | Dec. 18, 1951 |
| 2,602,468 | Allen et al. | July 8, 1952 |
| 2,704,085 | Bieger et al. | Mar. 15, 1955 |

FOREIGN PATENTS

| | | |
|---|---|---|
| 346,742 | Switzerland | July 15, 1960 |